United States Patent
Lipman et al.

(10) Patent No.: US 8,816,994 B2
(45) Date of Patent: *Aug. 26, 2014

(54) INPUT SYSTEM FOR CONTROLLING ELECTRONIC DEVICE

(71) Applicants: Robert Michael Lipman, Santa Monica, CA (US); Sarah Michelle Lipman, Santa Monica, CA (US)

(72) Inventors: Robert Michael Lipman, Santa Monica, CA (US); Sarah Michelle Lipman, Santa Monica, CA (US)

(73) Assignee: Power2B, Inc., Santa Monica, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/042,409

(22) Filed: Sep. 30, 2013

(65) Prior Publication Data

US 2014/0028631 A1    Jan. 30, 2014

Related U.S. Application Data

(63) Continuation of application No. 13/114,580, filed on May 24, 2011, now Pat. No. 8,547,364, which is a continuation of application No. 11/006,486, filed on Dec. 6, 2004, now Pat. No. 7,952,570, which is a continuation of application No. PCT/GB03/02533, filed on Jun. 9, 2003.

(30) Foreign Application Priority Data

Jun. 8, 2002 (GB) .................................. 0213215.7

(51) Int. Cl.
```
G09G 3/22      (2006.01)
G06F 3/03      (2006.01)
G06F 3/0482    (2013.01)
G06F 3/0354    (2013.01)
G06F 3/038     (2013.01)
G06F 1/16      (2006.01)
G06F 3/033     (2013.01)
```

(52) U.S. Cl.
CPC ............ *G06F 3/0317* (2013.01); *G06F 3/0304* (2013.01); *G06F 3/0482* (2013.01); *G06F 3/03545* (2013.01); *G06F 3/0386* (2013.01); *G06F 1/1626* (2013.01); *G06F 2203/04806* (2013.01)
USPC .......................................... 345/183; 178/19.05

(58) Field of Classification Search
USPC ........................................ 345/183; 178/19.05
See application file for complete search history.

(56) References Cited

U.S. PATENT DOCUMENTS 4,703,316 A    10/1987   Sherbeck
(Continued)

FOREIGN PATENT DOCUMENTS

| JP | 05265637 A | 10/1993 |
|----|------------|---------|
| JP | 08050526   | 2/1996  |
| WO | WO 03/104965 | 12/2003 |

OTHER PUBLICATIONS

EPO Search Report, Oct. 14, 2010, Arranz, Jose.

(Continued)

*Primary Examiner* — Adam J Snyder
(74) *Attorney, Agent, or Firm* — Paul Y. Feng; One, LLP

(57) ABSTRACT

An electronic device includes a display for displaying data stored on said electronic device; input means; sensing means for sensing the three-dimensional position of the input means relative to said device; and control means for controlling the data displayed on said display in dependence on the three-dimensional position of the input means relative to said device. The input means includes a source of electromagnetic radiation for directing an infrared conical beam onto the display. The sensing means can sense the elliptical eccentricity of the electromagnetic radiation incident on the display to determine the angle at which it strikes the display, and can sense the area of the electromagnetic radiation incident on the display to determine the distance of the input means from the display.

10 Claims, 2 Drawing Sheets

(56) References Cited

U.S. PATENT DOCUMENTS

| | | |
|---|---|---|
| 4,949,079 A | 8/1990 | Loebner |
| 5,926,168 A | 7/1999 | Fan |
| 5,959,617 A | 9/1999 | Bird et al. |
| 6,184,863 B1 | 2/2001 | Sibert et al. |
| 6,597,443 B2 | 7/2003 | Boman |
| 2002/0085097 A1 | 7/2002 | Colmenarez et al. |
| 2002/0148655 A1 | 10/2002 | Cho et al. |
| 2004/0252091 A1 | 12/2004 | Ma et al. |
| 2005/0156914 A1 | 7/2005 | Lipman et al. |

OTHER PUBLICATIONS

JPO Office Action, Sep. 28, 2010, Tomoya, Hatori.

INPUT SYSTEM FOR CONTROLLING ELECTRONIC DEVICE

CROSS-REFERENCE TO RELATED APPLICATIONS

This application is a continuation of application Ser. No. 13/114,580, filed May 24, 2011, now U.S. Pat. No. 8,547,364, which is a continuation of application Ser. No. 11/006,486, filed Dec. 6, 2004, now U.S. Pat. No. 7,952,570, which is a continuation of International Application No. PCT/GB03/02533, filed Jun. 9, 2003, which claims priority to United Kingdom Application No. 0213215.7, filed Jun. 8, 2002, all of which are hereby incorporated by reference.

BACKGROUND OF THE INVENTION

The present invention relates to computer navigation and particularly, but not exclusively, to an apparatus which facilitates navigation of software stored on the apparatus even where the display for the apparatus is small.

It is known to provide small, hand-held computer devices such as pocket organizers, Personal Digital Assistants (PDA's), cellular phones or the like. The current trend is to manufacture such devices to be as small in size as possible. Smaller devices are more easily carried and generally require a reduced power supply.

However, a significant disadvantage of such devices is that the reduced size forces a reduction in the size of the user interface, and particularly in the size of the screen or display used to display information or data stored on or processed by the device.

Many such devices have the processing power of conventional desktop or laptop computers or of similar devices many times their size and a number of products, such as the WACOM® and SONY® VAIO® pocket computers, are fully operable portable computers which use operating systems such as MICROSOFT® WINDOWS® or the like.

Those familiar with such pocket devices will appreciate the problem of displaying all of the necessary information on a relatively small display, particularly where the user is able to select specific functions from a large number of options. Conventionally, the selection of one option, for example, results in a new "window" opening which displays further options and sub options. Whilst devices having large displays are able to organize the data so that it is displayed in a more easily understood manner, devices having smaller screens tend to use data "layers" or "levels" whereby the selection of one option having a number of sub options causes the full screen to display the sub options fully eclipsing the original menu. The accidental selection of the wrong option requires a number of steps to return the display to the original list of options.

It would be advantageous to provide a pocket computer or hand held device which incorporates means for enabling easier access to data on the device and improves the user interface of the device.

BRIEF SUMMARY OF THE INVENTION

According to one aspect of the present invention, therefore, there is provided an electronic device having a display for displaying data stored thereon, input means and control means for controlling the data displayed on said display in dependence on the three-dimensional position of the input means with respect to said device.

Preferably, the device includes means for sensing or monitoring the position of the input means relative to the device.

In one embodiment, the input means includes a transmitter for transmitting a signal and the display includes sensing means for sensing the position at which the signal strikes the display. The signal may be in the form of a conical or circular infrared beam and the sensing means may be operable to sense the area and/or the intensity of the beam as it strikes the display thereby to determine the three-dimensional position of the input device relative to the display.

According to another aspect of the invention there is provided an input device for a computer or the like having a display for displaying data stored thereon, the input device comprising input means, and sensing means for sensing the three-dimensional position of the input means relative thereto and applying a position signal to said computer or the like in dependence on said three-dimensional position thereby to control the data displayed on said display.

BRIEF DESCRIPTION OF THE DRAWINGS

The present invention will now be described, by way of example only, with reference to the accompanying drawings in which.

DETAILED DESCRIPTION OF THE PREFERRED EMBODIMENTS

Figure 1:
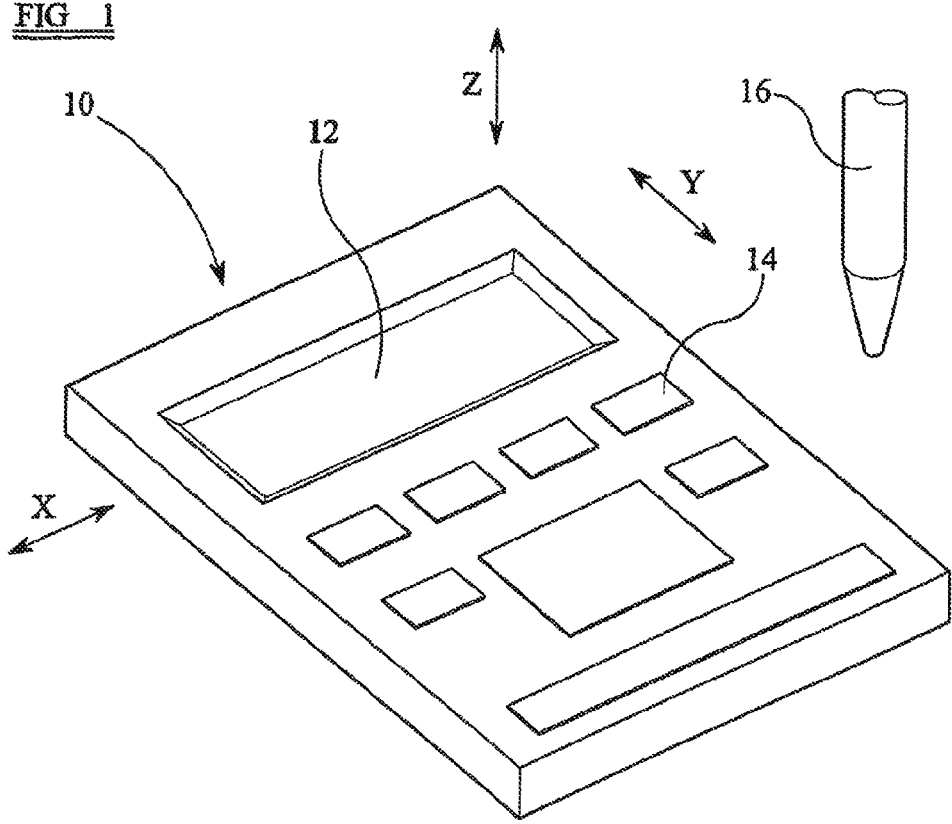
FIG. 1 shows illustratively a device according to the invention.

Referring to FIG. 1, an electronic device according to the invention is shown generally at 10. The device 10 may be, for example, a hand-held or "palm-top" computer, a personal digital assistant (PDA) or a mobile communication device such as a mobile telephone. The device 10 is capable of storing and displaying data from a display or screen 12 which may be a liquid crystal display, a dot matrix display or a TFT (thin film transistor) display.

Conventionally, the user of the device 10 controls the data displayed on the display 12 by means of a number of buttons 14 located on the device or by an input device such as a scratch pad or tracker ball. Alternatively, many such devices incorporate touch-sensitive displays which permit the user to select options or to change the data on the display 12 by means of a pencil-shaped pointing device which is physically pressed against the display at the required position thereby to select the required option. Such touch sensitive displays are able only to determine the two-dimensional, X-Y position of the pointing device relative to the display 12 when the pointing device is pressed against the surface of the display.

A disadvantage of such devices is that in order to achieve the required reduction in size to enable the device to be used as a hand-held device or pocket computer, the display 12 is made correspondingly smaller in size. However, depending on the application for which the device is intended, the display 12 may be required to display similar amounts of data to that of a conventional desktop or lap-top computer having a display which may be an order of magnitude larger in size. The small size of the display 12 reduces the amount of data which can be displayed at any given time.

To minimize the effects of this, the device is programmed to display data in a number of "levels" whereby the display 12 initially displays, for example, four options which are selectable by the user. Selecting one of these options, by means of the pointing device for example, may cause the display 12 to display a second "level" of options, for example in the form of a drop down list or menu commonly used in conventional computers. Each option displayed in the list may produce a further drop down list.

It will be appreciated that the number of levels used by the device is generally proportional to the number of options available to the user and inversely proportional to the size of the display. It is therefore quite common to find that a user may be required to select several options in order to activate a particular function of the device. This is time consuming and can be irritating to the user. Moreover, the generating of a drop down list or the like may obscure completely the original list so that an erroneous selection may require the user to manually exit from the current list in order to return to the original set of options. This may significantly increase the number of operations required to be made by the user.

According to the preferred form of the invention, the device 10 has a display 12 for displaying data stored on the device 10 which can be controlled by input means in the form of an input device 16. In the preferred embodiment, the input device 16 takes the form of a pen-shaped instrument, hereafter termed a "stylus" which allows the user to select various options displayed on the display 12. The concept of the invention is that the electronic device 10 is able to detect or monitor the three-dimensional position of the stylus 16 relative to the device 10, and in particular relative to the display. This permits, effectively "three-dimensional control" of the display 12 which can be used, for example, to achieve the following control functions.

Movement of the stylus 16 in the X or Y directions relative to the display 12 causes the cursor on the display 12 (for example the mouse pointer or equivalent) to move accordingly, in the manner of a conventional mouse. Importantly, however, movement of the stylus 16 in the Z direction, i.e. in a direction generally perpendicular to the display 12, performs a "zoom" function which, depending on the direction of movement of the stylus 16, either towards or away from the display, causes the display 12 either to zoom in or to zoom out.

In one embodiment, for example, movement of the stylus 16 in a direction towards the display 12 causes the data in the region of the display 12 corresponding to the X-Y position of the stylus 16 to be magnified in a manner similar to that achieved by the "zoom in" function of conventional computers and computer programs. Thus, the data in the region of the display 12 corresponding to the X-Y position of the stylus 16 is enlarged as the stylus 16 is moved closer to the display 12. This zooming in of the display 12 permits data relating to sub options to be displayed in place of the original option. However, whereas conventional software offers an "incremental zoom" with each discrete selection, the device described with reference to the drawings provides continuous zoom through constantly refreshed information based on the computed trajectory of the stylus. Continuous zoom makes possible an intuitive and responsive user interface.

When "zoom in" or "zoom out" reaches a pre-determined threshold, data relating to sub-options is displayed in addition to, or in place of (or first one then the other), the original option.

Figure 2:
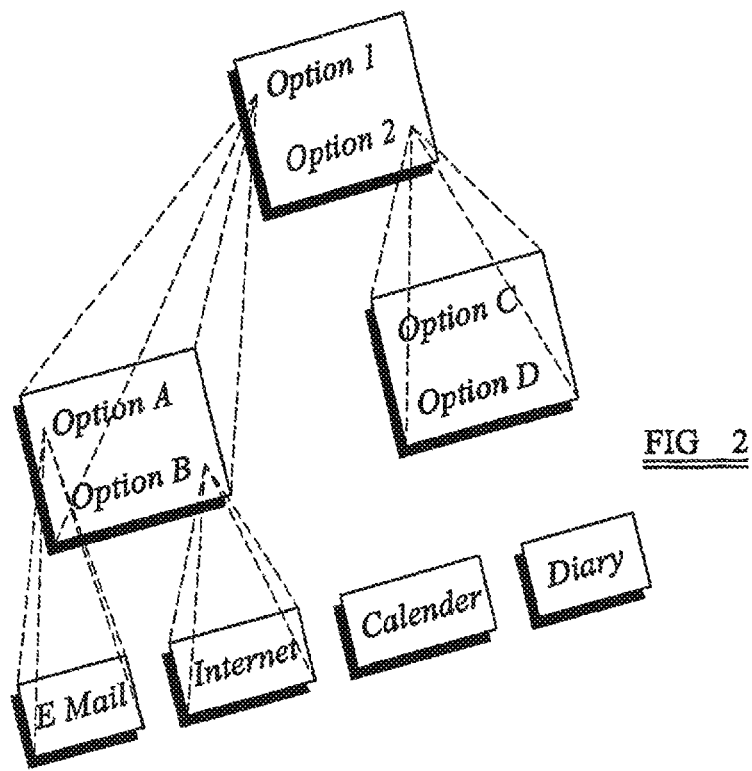
FIG. 2 shows illustratively the concept of data "levels"
Figure 3:
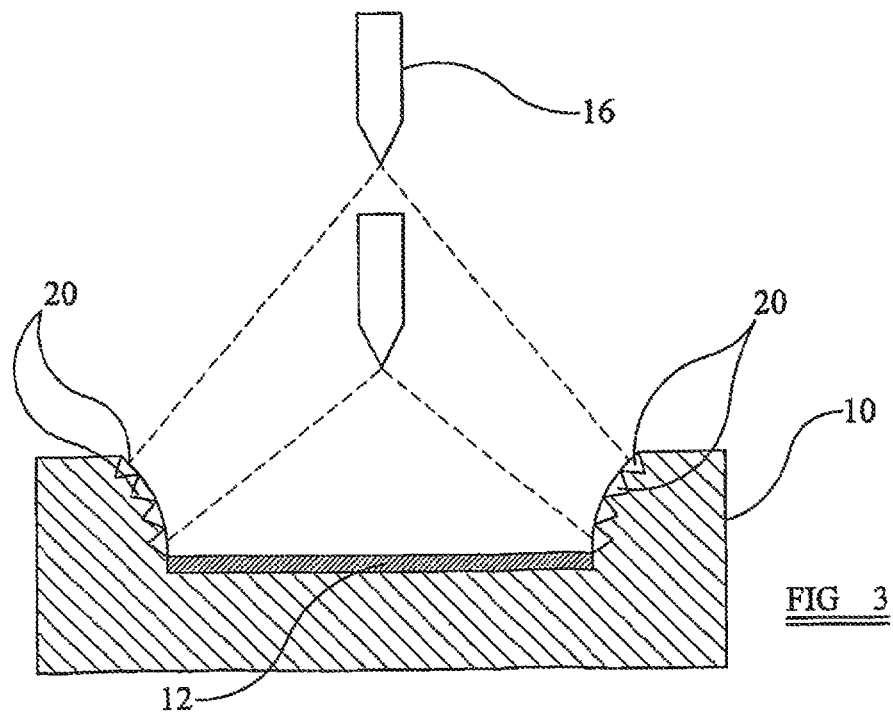
FIG. 3 shows illustratively a cross-section through a device according to one embodiment of the invention.

FIG. 2 illustrates the concept of "levels" of information to be displayed by the display 12. Initially, the displays "level 1" data which, as illustrated in FIG. 3, may give the user two choices, OPTION 1 and OPTION 2, which are selectable by the user. OPTION 1 represents specific "level 2" data which may, for example, include a further two choices, OPTION A and OPTION B. OPTIONs A and B represent respective "level 3" data which may, for example, represent different functions which the device 10 can perform, for example to send an e-mail or to access the internet.

Similarly, OPTION 2 in the level 1 data may correspond to OPTIONS C and D in the second level data, each of which represents different functions which may be performed by the device 10, for example opening a calendar or opening a diary.

In conventional devices, to select the internet function from the above example, the user would be required to press the stylus 16 onto the screen at OPTION 1 and then again at OPTION B and finally on the internet option. Thus, three separate operations are required. An incorrect selection, for example selection of OPTION A instead of OPTION B requires the user to select an "exit" option (not shown) in order to return to the level 1 data.

The present invention, on the other hand, permits the user to select, for example, the internet, with a minimum of individual operations. For example, in one embodiment, the user moves the stylus 16 over the part of the display 12 containing OPTION 1 and then moves the stylus 16 towards the display. The device 10 interprets the movement of the stylus 16 towards the screen as a "zoom in" operation which zooms the display 12 through the level 1 data towards the level 2 data until OPTION A and OPTION B are displayed on the screen. The user then alters the position of the stylus 16 in the X-Y plane until the stylus 16 is positioned over the OPTION B icon and again moves the stylus 16 towards the display. This movement "zooms in" through the level 2 data towards the level 3 data until the internet icon appears on the screen. This can then be selected by the user in the conventional manner, for example, by pressing the stylus 16 onto the screen at the required location.

It will be understood that the present invention relies on the ability of the device 10 to monitor, track or otherwise detect the X-Y-Z, three-dimensional position of the stylus 16 relative to the display 12 whilst the stylus 16 is not in contact with the display 12 itself, unlike conventional touch-sensitive displays. This may be achieved in a number of ways.

Figure 4:
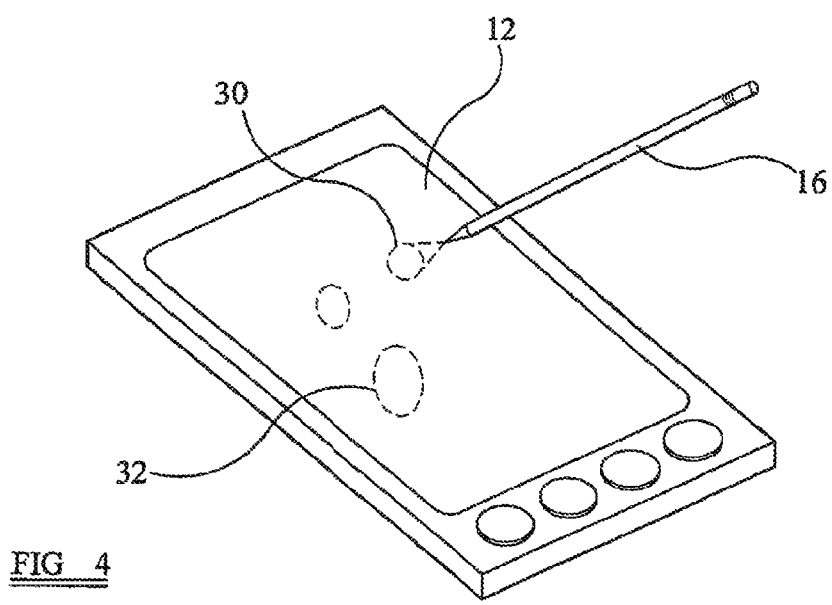
FIG. 4 shows illustratively one embodiment in which the stylus when moved closer to the display produces a circle or ellipse of smaller dimensions than the circle or ellipse formed when the stylus is moved away.

In one embodiment, the stylus 16 is a so-called "smart stylus" which contains a source of electromagnetic radiation, for example an infrared emitter, an LED or other such light emitting device (not shown). The stylus 16 emits a beam of light, for example infrared or other spectrum light, from a circular, spherical, or other shaped tip. The light is sensed by a sensitive layer (not shown) positioned over, or incorporate in, the display 12. The light sensitive layer may, for example, be in the form of a CCD or CMOS infrared sensitive array or the like. As the stylus 16 is moved across the display 12, only certain parts of the sensitive layer will be illuminated by the beam of light emitted by the stylus 16 and this will be detected by the sensitive layer. The sensitive layer determines the appropriate X-Y coordinates of the stylus 16 and sends a corresponding position signal to the central processing unit or similar of the device 10 which adjusts the display 12 accordingly. FIG. 4 is an example of this embodiment. The stylus 16 when moved closer to the display produces a circle or ellipse 30 of smaller dimensions than the circle or ellipse 32 formed when the stylus is moved away. The same eccentricity of the ellipse means that the input stylus is at the same angle to the display and the size of the area indicates the distance of the stylus from the display.

In an alternative embodiment, the stylus 16 operates in the manner of a conventional light pen and contains a light sensor or photodiode therein which senses the light given off by the display. The display 12 is scanned as in a conventional television screen so that the image is continually refreshed across and down the display 12 in a so-called raster scan. This continual refreshing causes the pixels in the display 12 to alternatively brighten and then dim at a very high frequency such that the effect is invisible to the naked eye.

However, the photodiode is able to detect this bright/dim effect and when the light received by the photodiode steps from dim to light, the stylus 16 sends a signal to the display controller in the device 10. Since the display controller creates the display signal, it knows the position of the current raster line and so it can determine which pixel on the display 12 is being refreshed when the stylus 16 sends the signal to the controller. The display controller then sets a latch which feeds two numbers, representative of the X and Y coordinates of the pixel, to the central processing unit or similar of the device 10 which is therefore able to determine where on the screen the stylus 16 is pointed.

The above examples describe only how the device 10 determines the X-Y coordinates of the stylus 16 relative to the display 12. It will be understood that the device 10 must also determine the Z-coordinate, i.e. the distance of the stylus 16 from the display. Again this can be achieved in a number of ways.

In one embodiment, the stylus 16 emits a beam of electromagnetic radiation, for example infrared or other spectrum light which is transmitted in a conical beam which widens in diameter with distance from the tip of the stylus 16.

The light incident on the display 12 and hence the sensitive layer is in the form of an ellipse, the eccentricity of which depends on the angle at which the light strikes the display 12 and hence the stylus 16 is being held. An eccentricity of 1, for example, is indicative of a circle of incident light and a vertically held stylus 16.

The distribution of the light incident on the sensitive layer will vary with distance from the light source in the stylus 16. When the stylus 16 is positioned at a distance from the sensitive layer of the display, the total area of the sensitive layer illuminated will be relatively large but the intensity of the incident light will be low. As the stylus 16 is moved closer to the display, the area the light incident upon the sensitive layer will decrease but the intensity will increase. At very short distances from the display, the area of the display 12 illuminated by the light from the stylus 16 will be small but the intensity will be high.

In order to measure the intensity of the incident light the continuous range of possible intensities may be divided into a number of thresholds of stimulation. Hence, the intensity of the light may be calculated according to which thresholds it falls between.

In operation, the sensitive layer detects the light incident on the display 12 and sends appropriate signals to the processing unit of the device 10. The elliptical eccentricity of the light incident on the display 12 is then calculated and from this the angle at which the stylus 16 is determined. The total area of light incident on the display 12 may also be calculated and from this the distance of the stylus 16 from the display 12 may be determined. Alternatively or additionally, the intensity of the incident light may be measured and used either to independently determine the distance of the stylus 16 from the display 12 or to refine the result of the calculation based on the measured area.

The angle of the stylus 16, in conjunction with the distance of the stylus 16 from the display 12 are then used to determine the vertical height of the stylus 16 above the display 12. Hence the position of the stylus 16, in the Z-dimension, is determined by the device 10.

Repetitive calculation of the stylus position, several times a second, as the stylus 16 is moved allows a stylus trajectory to be recorded. The stylus trajectory may then be used to assist in anticipating the intentions of the user.

The location and angle of the stylus 16 may also be used to determine when the user makes a selection without physical contact between the stylus 16 and the display. A simple dipping motion, for example, could be used to represent the selection. Alternatively or additionally the area and/or intensity of the light may also be used to represent a contactless selection. Such a selection may be indicated, for example, by the area of incident light falling below a certain minimum threshold and/or the intensity rising above a certain maximum threshold.

In a different embodiment, illustrated in FIG. 3, the device 10 is provided with a plurality of light sensors 20 positioned around the perimeter of the display 12. The light sensors are segmented or layered in the Z-direction such that as the stylus 16 moves towards or away from the display 12, different or segments or layers of the light sensors will be illuminated by the conical beam emitted by the stylus 16. In particular, as the stylus 16 moves closer to the screen, fewer of the light sensors around the display 12 will be illuminated, as illustrated in FIG. 3. The signals from the sensors are interpreted by the processing unit of the device 10, which thus calculates the distance of the stylus 16 from the display 12.

In yet a further embodiment, not shown, the display 12 is inset or sunk into the body of the device 10 to provide a surrounding wall. The wall is provided on two faces with a plurality of light emitting devices and on the other two faces by a corresponding number of light sensing devices. The light emitted by the light emitters are sensed by the opposing light sensors such that if the stylus 16 is moved towards the display 12, it will interrupt the light transmitted between some of the light emitters and the corresponding light sensors which will indicate to the device 10 that the stylus 16 has moved closer to the display. If the light emitters and sensors are layered in the Z-direction, this can provide an indication of the distance of the stylus 16 from the display.

It will be clear to those skilled in the art that there are a number of possible ways of sensing the X-Y-Z, three-dimensional position of the stylus 16 relative to the display, the above examples representing particularly simple and advantageous techniques. The important feature of the invention is that the user is able to alter the data displayed by the device 10 by moving the stylus 16 or other input device in three dimensions relative to the device 10 or the display 12 of the device 10.

It will be further understood that there are a number of modifications or improvements or variations on the above described invention which may provide particular advantages. Where the stylus 16 incorporates a light emitting device to produce a conical beam, the power of the device may be selected to produce a beam which is of a predetermined length and conical angle to restrict the amount of movement in the Z-direction required by the user to perform the zoom in or zoom out functions. The type of light emitter can be selected as desired to provide infrared or visible light or other forms of electromagnetic radiation may be used. The stylus 16 may alternatively include both a photodiode, to enable its use similar to a light pen, and a light emitter for establishing the Z-coordinate information. The stylus 16 may be connected to the device 10 by means of a cable for transmitting or receiving signals to and from the electronic device 10. Alternatively, the stylus 16 may be remotely linked to the device 10 or no data link may be provided at all. The latter situation is possible where a light emitting device is employed in the stylus 16.

The stylus could optionally be attached to the device with a simple tether (spiral plastic cord, etc.) simply to prevent its loss from a place where many people might use it often, such as a refrigerator, computer or a commercial site.

The device 10 may incorporate a touch-sensitive screen or a conventional screen by which a selection is achieved by means of a button or the like located on the stylus 16 which causes a signal to be sent to the electronic device 10, similar to conventional light guns or the like. Where a sensitive layer is used, this may be formed of any suitable material, which may additionally or alternatively be heat-sensitive. The sensitive layer may be layered above or below the screen of the display 12 or integrated therewith. The sensitivity and qualities of the material chosen can be selected as desired.

While the above described embodiments talk of sensing the position of the stylus 16 relative to the display 12 of the device 10, it will be appreciated that the three-dimensional position of the stylus 16 relative to any other part of the device 10 or relative to any fixed location could be used for the same purpose. In this regard, the invention may provide only a stylus 16 and a sensing "pad" or the like which is able to determine the three-dimensional position of the stylus 16 relative thereto. The pad could be connected for communication with the electronic device 10 by any suitable means which will be well understood. Such an embodiment may enable the stylus 16 and "pad" to be used with conventional desk top or laptop computers in place of the more conventional mouse, scratch pad or tracker ball.

It will be appreciated that the device 10 of the invention provides a number of advantages over existing systems. In particular, depth/height coordinates of the stylus 16 can be calculated from the device 10 and enable software on the device 10 to adapt the contents of the display 12 as the distance from the display 12 or device 10 changes. When the stylus 16 is brought closer to the display, the device 10 interprets this movement as an intention to select a coordinate within a specific range and zoom all of the information displayed within that coordinate to fill a larger part of the display. This enables the information display to intuitively come "closer" to meet the intention of the user. In addition, more space becomes available on the display 12 because fewer of the level 1 choices are shown and additional layers of choices, such as contextual menus, could be selectively added permitting more selections to be made with fewer "clicks" or selections of the stylus 16. Where two or more levels of selection are required, movement of the stylus 16 may permit the device 10 to anticipate the selection required by the user to allow the selection to be made with only a single operation of the stylus 16.

The invention claimed is:

1. An electronic input device, comprising:
   an input object;
   an input area;
   wherein the input object is operative to direct a geometric beam of electromagnetic radiation;
   an electromagnetic radiation pattern produced on the input area by the beam directed from the input object, wherein geometrical characteristics of the pattern are a function of the spatial relationship of the input object relative to the input area;
   sensing means positioned at least partially at a periphery of the input area, operative to sense and provide an output indication of at least two of position, orientation, shape, and size of the electromagnetic radiation pattern; and
   processing circuitry operative to receive the output indication and provide an electronic input representing at least one of two-dimensional position, three-dimensional position, and orientation of the input object relative to the input area.

2. An electronic input device according to claim 1, wherein the device further comprises a display providing a visually sensible output which is responsive to the input object.

3. An electronic input device according to claim 1, wherein the input object includes a stylus having a cylindrical shape with an end that emits the electromagnetic radiation.

4. An electronic input device according to claim 1, wherein the electromagnetic radiation includes radiation selected from the group consisting of infra red light, ultraviolet light, visible light, and collimated light.

5. An electronic input device, comprising:
   an input object;
   an input area;
   wherein the input object is operative to direct a shaped geometric beam of electromagnetic radiation;
   an electromagnetic radiation pattern produced on the input area by the beam directed from the input object;
   sensing means positioned at a periphery of the input area operative to sense and provide an output indication of at least two of position, orientation, shape, and size of the electromagnetic radiation pattern; and
   processing circuitry operative to receive the output indication and provide an electronic input representing at least one of two-dimensional position, three-dimensional position, and orientation of the input object relative to the input area.

6. A method for making an electronic input device, comprising:
   providing an input object;
   providing a physical input area;
   providing a sensor array positioned at least partially circumscribing and immediately proximate the input area;
   projecting electromagnetic radiation from the input object on to the input area to create an electromagnetic radiation pattern on the input area;
   sensing a portion of the electromagnetic radiation by the sensor array;
   providing an output indication of position and at least two of orientation, shape, and size of the sensed portion of the electromagnetic radiation; and
   providing input circuitry that receives the output indication and provides an electronic input representing at least one of two-dimensional position, three-dimensional position, and orientation of the input object.

7. The method of claim 6, wherein the electromagnetic radiation pattern is created on the input area and includes an elliptical shape having a geometry which is a function of the location of the input object relative to the input area.

8. An electronic input device, comprising:
   an input area;
   an input object projecting a beam of electromagnetic radiation on the input area;
   a sensor array positioned outside the input area operative to sense and provide an output indication of position and at least two of orientation, shape and size of said electromagnetic radiation on the input area produced by the input object;
   wherein the electromagnetic radiation pattern includes an elliptical shape having a size that is a function of the distance of the input object relative to the input area; and
   input circuitry receiving the output indication and providing an electronic input representing at least one of two-dimensional position, three-dimensional position, and orientation of the input object.

9. An electronic input device, comprising:

an input object emitting electromagnetic radiation;

an input area;

a sensor array positioned outside the input area operative to sense and provide an output indication of position and at least two of orientation, shape, and size of an electromagnetic radiation pattern on the input area produced by the input object;

input circuitry receiving the output indication and providing an electronic input representing at least one of two-dimensional position, three-dimensional position and orientation of the input object;

wherein the electronic input representing orientation includes an electronic input representing angular orientation of the input object relative to the input area; and the input object includes a source of the electromagnetic radiation, and wherein the sensing array senses the electromagnetic radiation pattern correlating to an elliptical pattern produced by a conical beam that intersects the input area in a pattern forming the ellipse having properties that are a function of at least one of position, distance and orientation of the input object.

10. An electronic input device, comprising:

an input object directing an electromagnetic beam;

an input area;

an electromagnetic radiation pattern produced on the input area by the beam directed from the input object;

sensing means positioned at least partially at a periphery of the input area, operative to sense and provide an output indication of the area and intensity of the beam as the beam strikes the input area, thereby to determine the three-dimensional position of the input object relative to the input area; and processing circuitry operative to receive the output indication and provide an electronic input representing the three-dimensional position of the input object relative to the input area.

* * * * *